United States Patent [19]

Matsunaga

[11] Patent Number: 5,061,044
[45] Date of Patent: Oct. 29, 1991

[54] FERROELECTRIC LIQUID CRYSTAL DISPLAY HAVING OPPOSINGLY INCLINED ALIGNMENT FILMS WHEREIN THE LIQUID CRYSTAL HAS ONE TWISTED AND TWO ALIGNED STATES WHICH COEXIST AND A DRIVING METHOD TO PRODUCE GRAY SCALE

[75] Inventor: Masaaki Matsunaga, Sayama, Japan
[73] Assignee: Citizen Watch Co., Ltd., Tokyo, Japan
[21] Appl. No.: 526,879
[22] Filed: May 22, 1990

[30] Foreign Application Priority Data

May 23, 1989 [JP] Japan .................................. 1-129493
Oct. 6, 1989 [JP] Japan .................................. 1-259925

[51] Int. Cl.$^5$ .............................................. G02F 1/13
[52] U.S. Cl. ...................................... 359/75; 340/784; 359/56; 359/84
[58] Field of Search ................. 350/339 R, 341, 340, 350/350 S, 333, 332, 331 R; 340/784 S

[56] References Cited

U.S. PATENT DOCUMENTS

| | | | |
|---|---|---|---|
| 4,563,059 | 1/1986 | Clark et al. | 350/330 |
| 4,662,721 | 5/1987 | Harada et al. | 350/339 R |
| 4,813,767 | 3/1989 | Clark et al. | 350/341 |
| 4,900,132 | 2/1990 | Bos | 350/346 |
| 4,904,064 | 2/1990 | Lagerwall et al. | 350/350 S |
| 4,932,758 | 6/1990 | Hanyu et al. | 350/350 S |
| 4,958,916 | 9/1990 | Clark et al. | 350/350 S |

FOREIGN PATENT DOCUMENTS 69-192724 6/1987 Japan .

OTHER PUBLICATIONS

Clark et al., "Ferroelectric Liquid Crystal Electro-Optics Using Surface Stabilized Structure", Mol. Cryst. Liq. Cryst., 1983, vol. 94, pp. 213–234.
Armitage, "Alignment of Liquid Crystals on Obliquely Evaporated Slicon Films", Journal Applied Physcis 51(5), 5/80.

Primary Examiner—Stanley D. Miller
Assistant Examiner—Ron Trice
Attorney, Agent, or Firm—Townsend and Townsend

[57] ABSTRACT

There is disclosed a ferroelectric liquid crystal device which sandwiches a ferroelectric liquid crystal between a pair of substrates having transparent electrodes on opposing surfaces thereof, and in which the ferroelectric liquid crystal can take three stable states of a twisted aligned state, and two uniform aligned states, wherein alignment films are formed by oblique deposition of an inorganic insulating member so that inclination direction of each substrate is opposing, and a thickness of a liquid crystal layer between the substrates is set to fall within a range of 1.5 μm to 4 μm. There is also disclosed a method of driving the ferroelectric liquid crystal device.

4 Claims, 7 Drawing Sheets

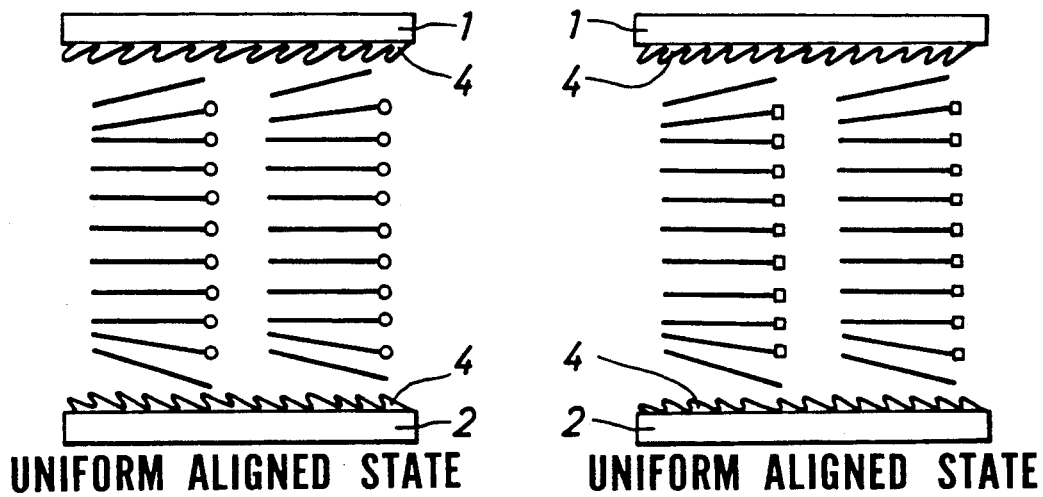
FIG. 3(A) UNIFORM ALIGNED STATE
FIG. 3(B) UNIFORM ALIGNED STATE
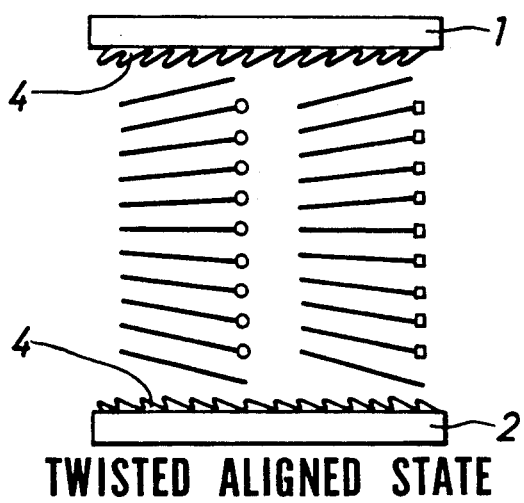
FIG. 3(C) TWISTED ALIGNED STATE

FIG. 6
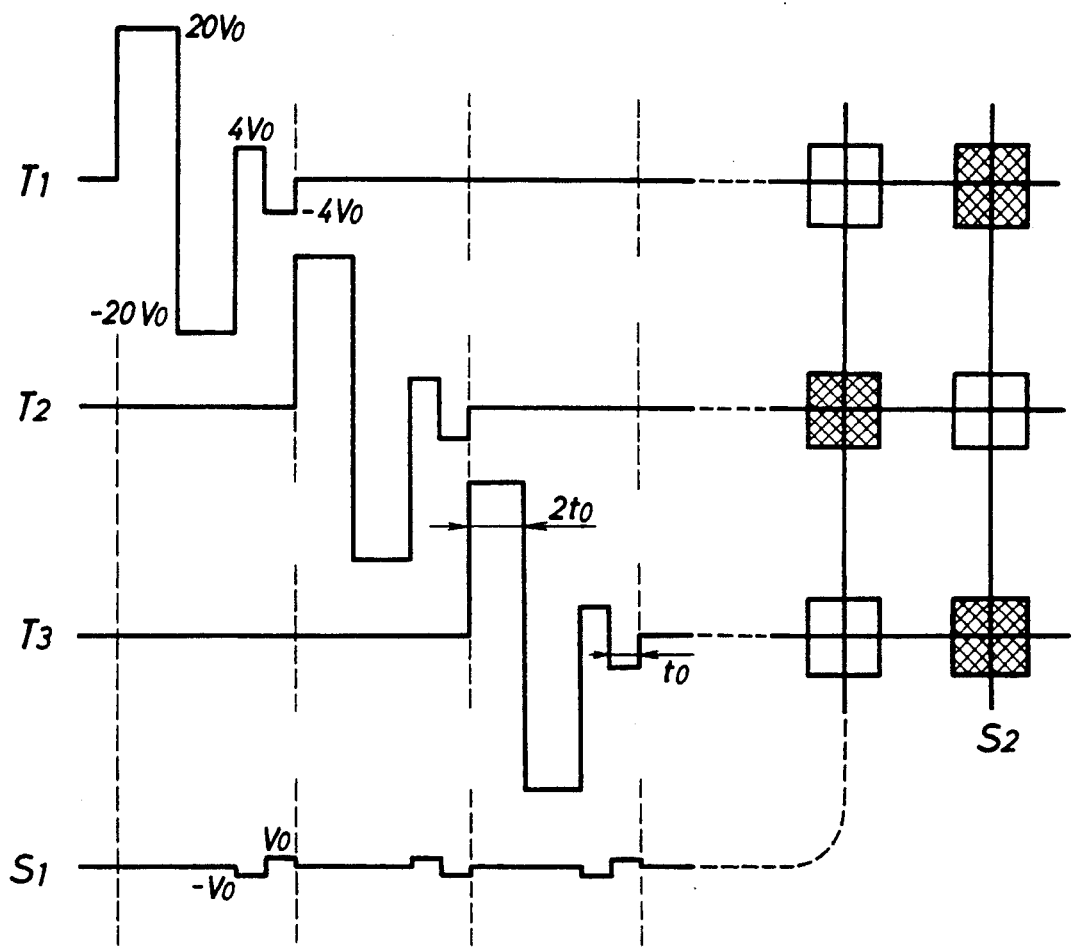
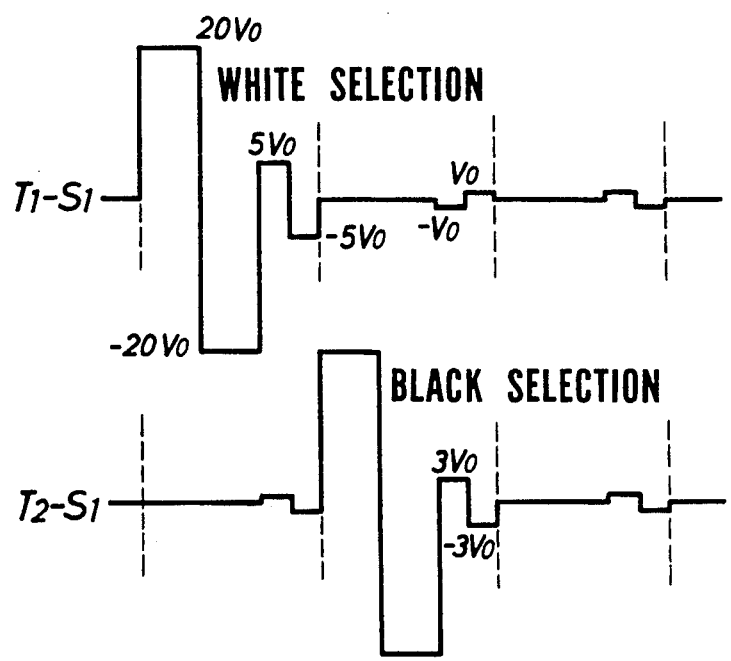

FERROELECTRIC LIQUID CRYSTAL DISPLAY HAVING OPPOSINGLY INCLINED ALIGNMENT FILMS WHEREIN THE LIQUID CRYSTAL HAS ONE TWISTED AND TWO ALIGNED STATES WHICH COEXIST AND A DRIVING METHOD TO PRODUCE GRAY SCALE

BACKGROUND OF THE INVENTION

1. Field of the Invention

The present invention relates to a liquid crystal device and, more particularly, to a ferroelectric liquid crystal device having both a high-speed response characteristic and a memory effect and a method of driving the same.

2. Description of the Prior Art

It is expected that a ferroelectric liquid crystal is applied to a high-speed liquid crystal shutter for a printer and large-capacity display by utilizing its memory effect and high-speed response characteristic.

Most of ferroelectric liquid crystal devices manufactured as test samples so far are those in which a ferroelectric liquid crystal is sandwiched between two glass plates each having alignment films composed of rubbed organic polymer films or oblique deposited inorganic insulating member as of SiO on opposing surfaces. For example, Japanese Patent Laid-Open No. 62-173433 discloses a liquid crystal device using a rubbed polyimide thin film. In a liquid crystal device of this type, all the liquid crystal molecules are aligned in the same direction to be parallel to the glass substrate surfaces, i.e., in a uniform aligned state upon application of a voltage. When a driving voltage is reset to zero, the uniform alignment is disordered, and the liquid crystal molecules define a twisted structure between the glass substrates, i.e., are in a twisted aligned state. As a result, a memory effect is considerably impaired.

In contrast to this, as in a method disclosed in Japanese Patent Laid-Open No. 62-250418, a liquid crystal device in which two substrates having alignment films formed by SiO oblique deposition are arranged so that each direction of deposition in the same inclination state can provide a memory effect. However, memory nonuniformity locally occurs, and uniform switching characteristics are difficult to obtain.

Japanese Patent Laid-Open No. 62-160420 discloses a liquid crystal device in which stable states of liquid crystal molecules include two different uniform aligned states and a twisted aligned state. It is demonstrated that this liquid crystal device does not much suffer from display nonuniformity caused by memory nonuniformity. However, a definite structure of a liquid crystal device which can take three stable display states and a satisfactory method of driving the same have not been developed yet.

Another problem posed in a practical application of a ferroelectric liquid crystal device is that a bright state of a ferroelectric liquid crystal device is undesirably colored in a variety of colors depending on refractive index anisotropy of liquid crystal molecules and a thickness of a liquid crystal layer, and the ferroelectric liquid crystal device is not easy to perform black-and-white display.

Furthermore, when a ferroelectric liquid crystal device is put into a practical application, continuous gray scale control of a transmittance in a multiplex driving mode poses a serious technical problem. For example, Japanese Patent Laid-Open No. 62-160420 tries gray scale display in the multiplex driving mode by utilizing three states, i.e., two different uniform aligned states and a twisted aligned state. However, in this prior art, only three gray scale levels can be displayed. Japanese Patent Laid-Open No. 59-193427 discloses a technique in which the number of driving pulses is changed to cause bistable states to coexist, thereby making an attempt of gray scale display. However, according to the experiments of the present inventors, halftone level changed over time in the multiplex driving mode, and stable halftone display could not be obtained.

SUMMARY OF THE INVENTION

It is a first object of the present invention to provide a ferroelectric liquid crystal device which has a good memory effect and memory uniformity, and can provide a bright state closer to white.

It is a second object of the present invention to provide a method of driving the ferroelectric liquid crystal device attained by the first object.

It is a third object of the present invention to provide a method of driving a ferroelectric liquid crystal device which can precisely reproduce continuous gray scale levels even in a multiplex driving mode.

In order to achieve the first object, the present invention provides a new structure and driving method of a liquid crystal device which has a twisted aligned state as one stable state.

In order to realize a liquid crystal device which has a stable twisted aligned state and two uniform aligned state, alignment films of an inorganic insulating member are formed by oblique deposition on opposing surfaces of a pair of substrates having transparent electrodes on the opposing surfaces so that each direction of the deposition is reverse, and a ferroelectric liquid crystal is sandwiched between the substrates, so that a thickness of the liquid crystal layer is set to fall within the range of 1.5 $\mu$m to 4 $\mu$m.

Furthermore, in order to achieve the second object, the twisted aligned state and one of the two uniform aligned states of the liquid crystal device are used as two stable states to perform binary photoelectric control.

A method of driving the liquid crystal device for performing the binary photoelectric control is as follows. That is, a pair of positive and negative pulses having a magnitude capable of changing an aligned state from one of the two uniform aligned states to the other are applied across the transparent electrodes in order to set the uniform aligned state that is one of the two stable states for binary control. In order to set the twisted aligned state as the other of the two stable states for binary control, the same positive and negative pulses used for setting the uniform aligned state are applied first, and a pair of pulses in which a product of a voltage value and a pulse width is decreased stepwise so as not to set the other uniform aligned state are then applied.

In order to achieve the third object, a voltage signal in which a product of a voltage peak value and a pulse width is modulated is applied across transparent electrodes of the ferroelectric liquid crystal device, in which the twisted and two uniform aligned states are sufficiently stable, to control a coexistence ratio of twisted and uniform aligned states, thereby achieving continuous gray scale display.

BRIEF DESCRIPTION OF THE DRAWINGS

FIGS. 3(a), 3(b), and 3(c) are views respectively showing two uniform aligned states and a twisted aligned state of the liquid crystal device;

FIG. 6 is a chart showing driving signal waveforms for matrix-driving the ferroelectric liquid crystal device according to the present invention;

DETAILED DESCRIPTION OF THE PREFERRED EMBODIMENTS

The present invention will be described hereinafter with reference to the accompanying drawings.

Figure 1:
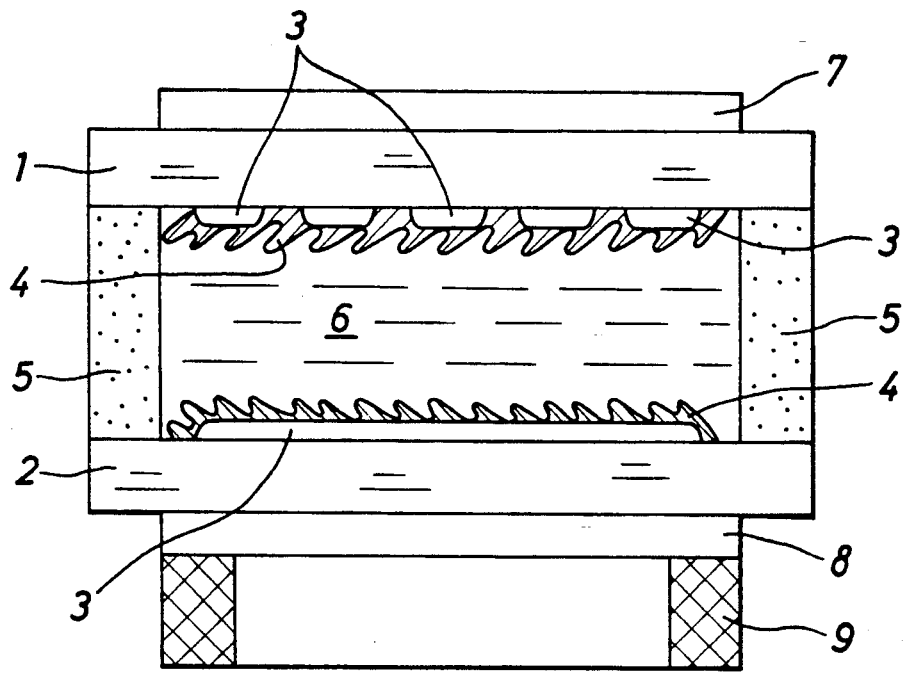
FIG. 1 is a sectional view showing an embodiment of a ferroelectric liquid crystal device according to the present invention.

FIG. 1 is a sectional view showing an embodiment of a ferroelectric liquid crystal device according to the present invention.

1,200-Å thick $In_2O_3$ transparent electrodes 3 are deposited on opposing surfaces of opposing glass substrates 1 and 2. SiO inclined alignment layers 4 are deposited on the transparent electrodes to have opposite inclined states. A gap between the two alignment layers 4 is set to fall within the range of 1.5 $\mu$m to 4.0 $\mu$m.

A liquid crystal mixture 6 which contains 40 wt. % or more of an ester ferroelectric liquid crystal (e.g., a liquid crystal composition CS-1014 available from Chisso Corp.) which is easily aligned by the SiO inclined alignment layers 4 is filled in a liquid crystal cell constituted by the two glass substrates 1 and 2 and epoxy resin seals 5 arranged at two ends of the two glass substrates. Polarization plates 7 and 8 in a crossed nicols state are arranged outside the glass substrates 1 and 2. A heater 9 for holding a constant temperature of the liquid crystal device is attached to the outer surface of one polarizer 8.

The liquid crystal device in which the ferroelectric liquid crystal is sandwiched between the two glass substrates having the alignment layers of an inorganic insulating member oblique deposited in opposite directions has different liquid crystal aligned states depending on the thickness of the liquid crystal layer.

Figure 2:
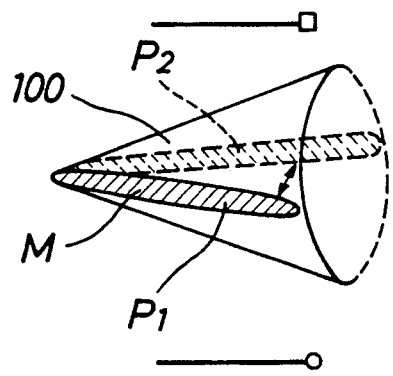
FIG. 2 is a view for explaining movements of liquid crystal molecules.

FIG. 2 shows movements of ferroelectric liquid crystal molecules. A liquid crystal molecule M (an elongated hatched portion) can take three positions, i.e., a position $P_1$ on a near side of a cone 100 (indicated by a solid line), a position $P_2$ on a far side of the cone 100 (opposite side indicated by a broken line), and an intermediate position therebetween.

FIGS. 3(a) to 3(c) are views showing possible liquid crystal aligned states of the liquid crystal molecules in the ferroelectric liquid crystal device. FIGS. 3(a) and 3(b) show uniform aligned states, and FIG. 3(c) shows a twisted aligned state. In FIGS. 3(a) to 3(c), a bar with a mark "o" indicates a case wherein a liquid crystal molecule takes the position $P_1$ of the cone 100, as shown in FIG. 2, a bar with a mark "□" indicates a case wherein a liquid crystal molecule takes the position $P_2$, and a bar with no mark indicates a case wherein a liquid crystal molecule takes an intermediate position between the positions $P_1$ and $P_2$. In FIGS. 3(a) to 3(c), reference numerals 1 and 2 denote the glass substrates; and 4, the alignment layers. In the uniform aligned state shown in FIG. 3(a), only liquid crystal molecules near the glass substrate interfaces are twisted counterclockwise. The twisted aligned state shown in FIG. 3(c) includes both counterclockwise and clockwise twisted aligned states. It is experimentally revealed thatthe aligned states shown in FIGS. 3(a), 3(b), and 3(c) have different stable states depending on the thickness of the liquid crystal layer. More specifically, when the thickness of the liquid crystal layer is 4 $\mu$m or more, and a positive or negative voltage is applied thereto, liquid crystal molecules are aligned once in the uniform aligned state shown in FIG. 3(a) or 3(b). However, when a voltage is reset to zero, the liquid crystal molecules tend to be stable in only the twisted aligned state shown in FIG. 3(c). In contrast to this, when the thickness of the liquid crystal layer is set to be 1.5 $\mu$m or less, both the aligned states shown in FIGS. 3(a) and 3(b) maintain those upon application of a voltage after the voltage is reset to zero, that is, a so-called bistable state can be exhibited. However, the stability of these states tends to be deviated to one state. More specifically, threshold voltage largely varies locally, resulting in nonuniformity of memory characteristics. When the thickness of the liquid crystal layer falls within the range of 1.5 $\mu$m to 4 $\mu$m, according to the experimental results of the present inventors, three stable aligned states shown in FIGS. 3(a), 3(b), and 3(c) can be independently present. Since the aligned state shown in FIG. 3(c) corresponds to an intermediate state of the uniform aligned states shown in FIGS. 3(a) and 3(b), it can be easily obtained by application of positive and negative voltages decreasing a peak value or a pulse width while switching the aligned states shown in FIGS. 3(a) and 3(b). Thereafter, this state can be semipermanently maintained unless another voltage is applied. Furthermore, since the intermediate state shown in FIG. 3(c) is present, write voltages of the uniform aligned states shown in FIGS. 3(a) and 3(b) can have almost the same values, and nonuniformity of memory characteristics can be considerably eliminated.

Figure 4:
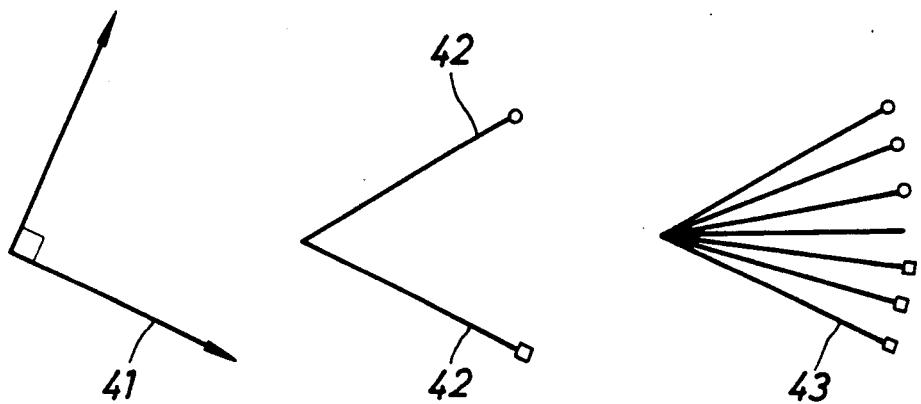
FIG. 4 is a view showing the positional relationship between liquid crystal molecule arrays and a polarizer.

To summarize changes in aligned states of a liquid crystal depending on the thickness of the liquid crystal layer, when the liquid crystal layer has a thickness of 4 $\mu$m or more, a monostable state of only the twisted aligned state tends to be established. When the thickness falls within the range of 1.5 $\mu$m to 4 $\mu$m, the three stable states, i.e., the two uniform aligned states and the twisted aligned state are established. When the thickness of the liquid crystal layer is decreased below 1.5 $\mu$m, only the two uniform aligned states are stable, but asymmetry memory characteristics locally occur. On the other hand, when the ferroelectric liquid crystal device is switched using the twisted aligned state and the uniform aligned states, coloring of a bright state can be eliminated as compared to conventional switching between only the uniform aligned states, and clear black-and-white display can be attained. This is because the twisted aligned state has different optical characteristics from those of the uniform aligned states. That is, since liquid crystal molecules are aligned in a twisted state unlike in the uniform aligned state in which liquid crystal molecules are aligned in one direction between the upper and lower substrates, light rotates when it passes through the liquid crystal device. FIG. 4 shows aligned states of liquid crystal molecules. As shown in FIG. 4, when the polarizers are arranged on the upper and lower substrates so that an axis of polarization 44 in the crossed nicols state coincides with a direction of liquid crystal molecules 41 in one uniform aligned state, a dark state is established by the aligned state of the liquid crystal molecules 41, thus obtaining black level of the polarizers whose polarization directions are perpendicular to each other.

On the other hand, a bright state established by the uniform aligned states of liquid crystal molecules 42 is colored, and transmission light T is expressed by equation (1) as a function of refractive index anisotropy $\Delta n$ of a liquid crystal, a thickness d of a liquid crystal layer, and a wavelength $\lambda$ of the transmission light:

$$T = \sin^2(\pi \Delta n d / \lambda) \dots \quad (1)$$

With respect to a $\Delta n$ value of 0.15 of a typical ferroelectric liquid crystal, when d exceeds 2 $\mu$m, considerable coloring occurs; when d = 2.5 $\mu$m, a bright state is colored in yellow; when d = 3 $\mu$m, red; and when d = 4 $\mu$m, light blue. In contrast to this, a coloring phenomenon is eliminated due to optical rotation in the twisted aligned state in which liquid crystal molecules 43 in FIG. 4 are continuously changed. In this case, when d = 2.5 $\mu$m, a bright state is colored in white; when d = 3 $\mu$m, cream; and when d = 4 $\mu$m, light yellow. Thus, up to the thickness of the liquid crystal layer of about 4 $\mu$m, a ferroelectric liquid crystal device which can perform black-and-white display almost free from coloring can be obtained by switching the twisted aligned state and the uniform aligned states.

Figure 5:
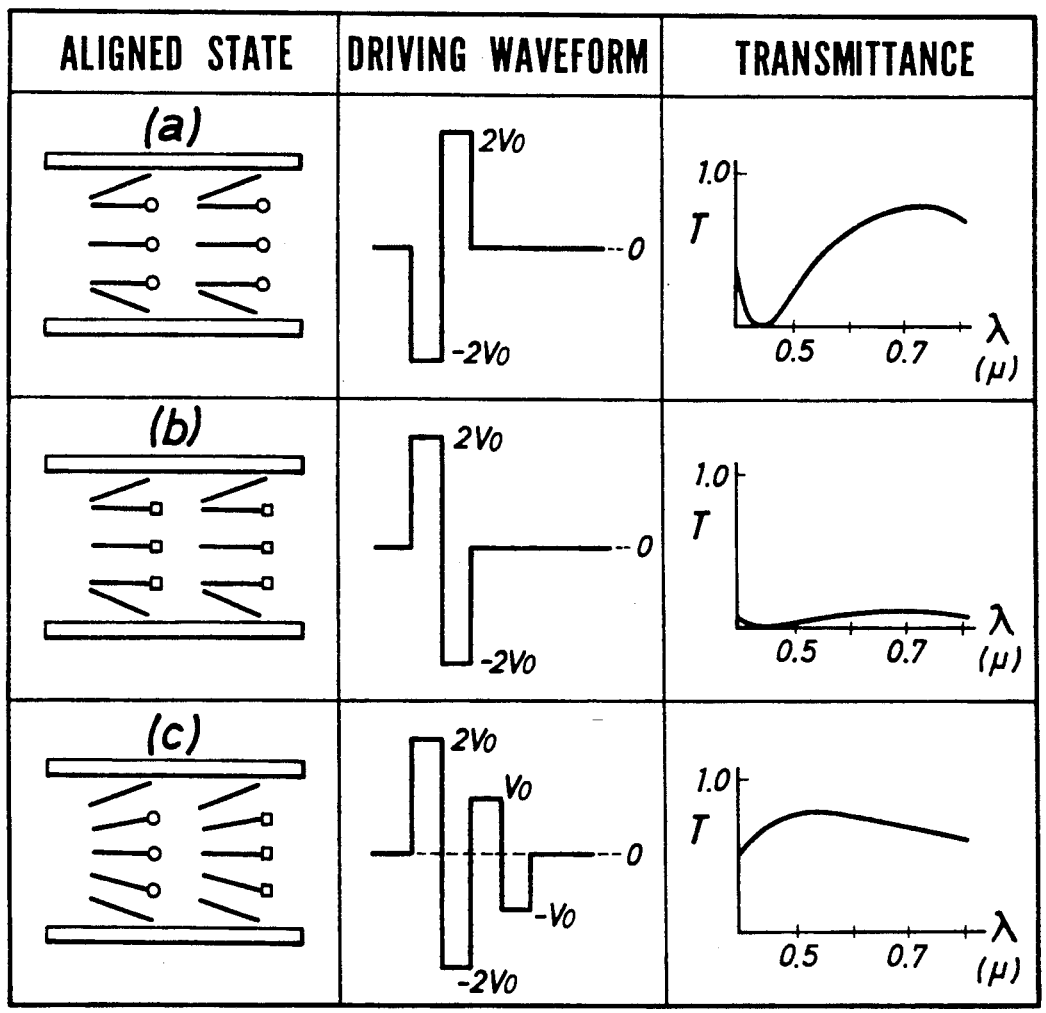
FIG. 5 is a table showing transmission light characteristics corresponding to aligned states of liquid crystal molecules and driving waveforms for selecting the corresponding aligned states.

FIG. 5 shows operation modes of a liquid crystal device which has a thickness of a liquid crystal layer of 3.0 $\mu$m, and is formed of the ferroelectric liquid crystal composition CS-1014 available from Chisso Corp.

A uniform aligned state (a) with reddish transmission light is obtained by a positive-negative symmetrical voltage waveform having a pulse width of 1 ms and peak values of $-2V_0$ and $2V_0$ ($V_0 = 15$ V). A uniform aligned state (b) of black level is obtained by a symmetrical voltage waveform having the same pulse width as above and peak values of $2V_0$ and $-2V_0$. Furthermore, a twisted aligned state (c) with transmission light almost close to white is obtained by a symmetrical voltage waveform whose peak values are decreased like $2V_0$, $-2V_0$, $V_0$, and $-V_0$. When the value of the first positive/negative value ($2V_0$) equals to 30 V, if the peak value of the second pulse is 5 to 20 V, an aligned state is changed to the twisted aligned state. These three aligned states (a), (b), and (c) are semipermanently stable unless another voltage is applied, and there is no local variation in conversion voltage among these states, thus allowing a satisfactory switching operation. The present inventors examined 10 to 20 kinds of liquid crystal material mixtures containing ester ferroelectric liquid crystals, and found that the thickness of the liquid crystal layer with which the aligned states (a), (b), and (c) could stably appear without nonuniformity fell within the range of 1.5 $\mu$m to 4.0 $\mu$m, and preferably fell within the range of 2 $\mu$m to 3.5 $\mu$m. When the liquid crystal layer had a thickness falling within this range, the aligned states exhibited almost identical stable states without nonuniformity.

The present inventors prepared a 2.7" ferroelectric liquid crystal device having 128 scanning electrodes and 160 signal electrodes under the condition described in the above embodiment, being 3.0 $\mu$m thickness of the liquid crystal layer and using the liquid crystal composition CS-1014, and tried actual driving display. As driving waveforms, as shown in FIG. 6, two pairs of positive-negative symmetrical voltage waveforms in which voltage peak values and pulse widths are decreased are applied to the scanning electrodes ($T_1$, $T_2$, $T_3$, ...). A negative-positive symmetrical waveform is applied to the signal electrodes ($S_1$, $S_2$, ...) in a write mode of a white state, and a positive-negative symmetrical waveform is applied in a write mode of a black state. A pixel $T_1-S_1$ selected in a white state is once set in a uniform aligned black state written by a positive-negative symmetrical voltage waveform having a peak value of $20V_0$ and a pulse width of $2t_0$, and is then converted to a twisted aligned white state by a positive-negative symmetrical voltage waveform having a peak value of $5V_0$ exceeding a threshold value for converting an aligned state to a twisted state and a pulse width of $t_0$. This state is not disturbed by a bias voltage in a non-selection mode of $\pm V_0$, and the pixel $T_1-S_1$ is kept in the white state. On the other hand, a pixel $T_2-S_1$ selected in a black state is converted to black level by a $\pm 20V_0$ voltage waveform, and thereafter, the uniform black state is not disturbed by a $\pm 3V_0$ voltage waveform. Thus, the pixel $T_2-S_1$ is kept at black level. In particular, as a result of the experiments for $V_0 = 1.5$ V and t = 4 ms, black-and-white display having a contrast ratio = 10 could be obtained, which was impossible to obtain in switching between uniform aligned states when the thickness of the conventional liquid crystal layer = 3 $\mu$m.

As described in the above embodiment, a ferroelectric liquid crystal device which has a thickness of a liquid crystal layer of 1.5 $\mu$m to 4.0 $\mu$m and can take three stable states according to the present invention can perform a satisfactory switching operation having uniform memory characteristics, and can realize black-and-white display which cannot be realized by a conventional ferroelectric liquid crystal display device having a thickness of a liquid crystal layer of 2 $\mu$m or more.

A driving method for gray scale control using a ferroelectric liquid crystal device according to the present invention will be described below.

Figure 7A:
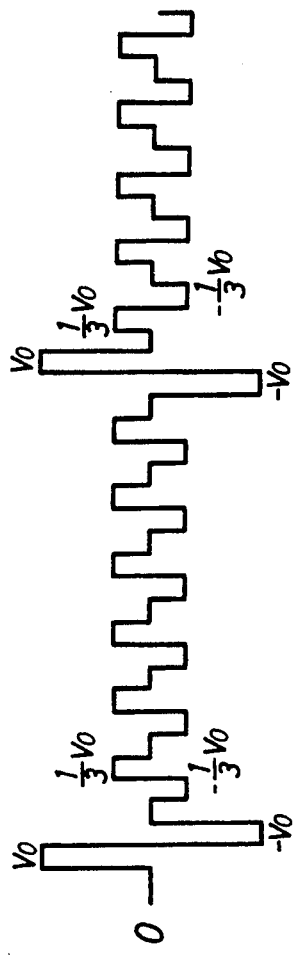
FIGS. 7A, 7B, and 7C are waveform charts showing fluctuations of stable states of ferroelectric liquid crystal device in a multiplex driving mode.
Figure 7B:
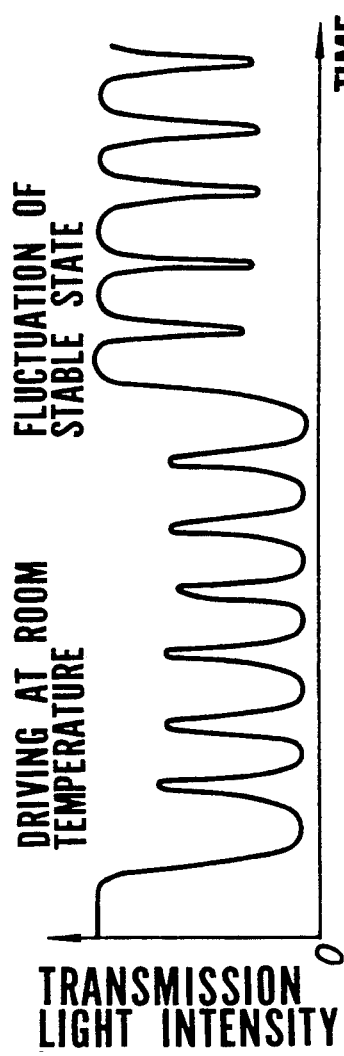
Figure 7C:
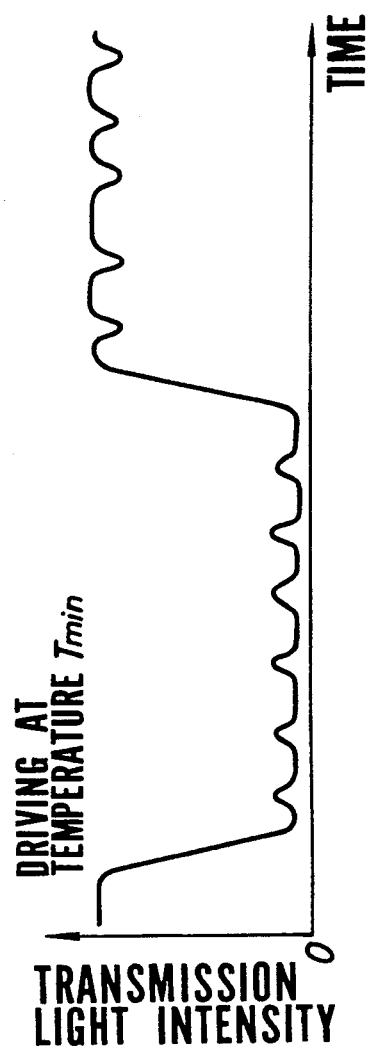

The temperature of a liquid crystal device was set by the heater 9 (FIG. 11) at a temperature lower by about 15° C. than an upper limit temperature of a chiral smectic phase within a temperature range of the chiral smectic phase. This is because when a multiplex driving test waveform of a selection voltage $\pm V_0$ shown in FIG. 7A is applied, a driving temperature $T_{min}$ for minimizing fluctuation of a stable state shown in FIG. 7B falls within the range of 10° C. to 20° C. lower than the upper limit temperature of the chiral smectic phase within the temperature range of the chiral smectic phase exhibiting ferroelectric characteristics, as shown in FIG. 7C.

Figure 8:
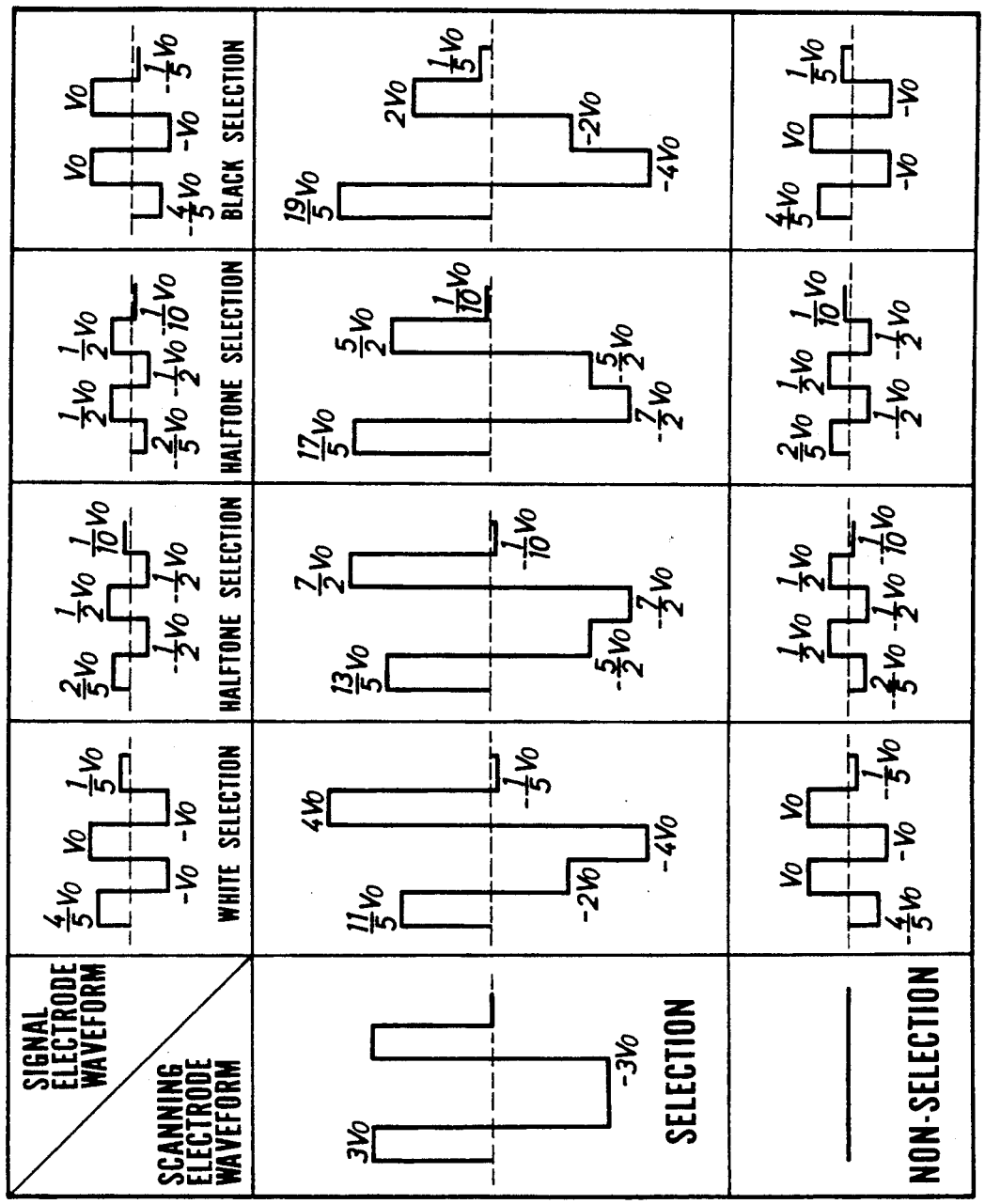
FIG. 8 is a table showing multiplex driving waveforms of the ferroelectric liquid crystal device according to the present invention.
Figure 9A:
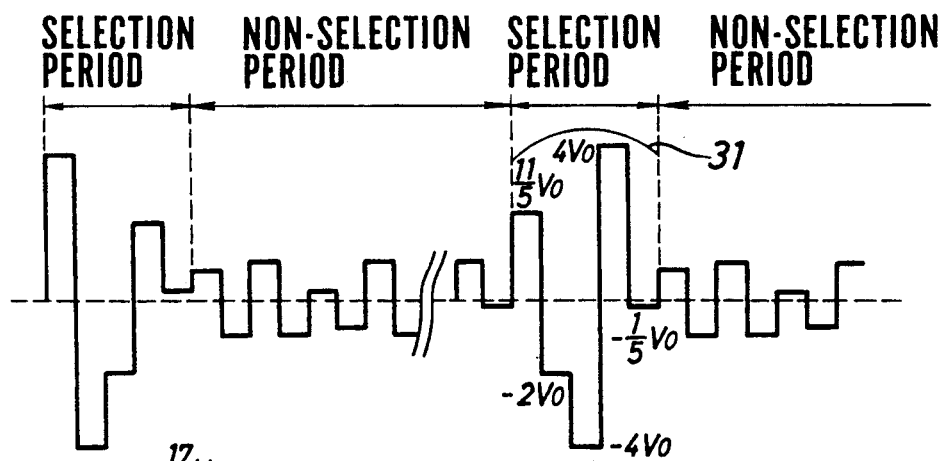
FIGS. 9(a) and 9(b) are charts for explaining an optical response of the ferroelectric liquid crystal device in the multiplex driving mode.
Figure 9B:
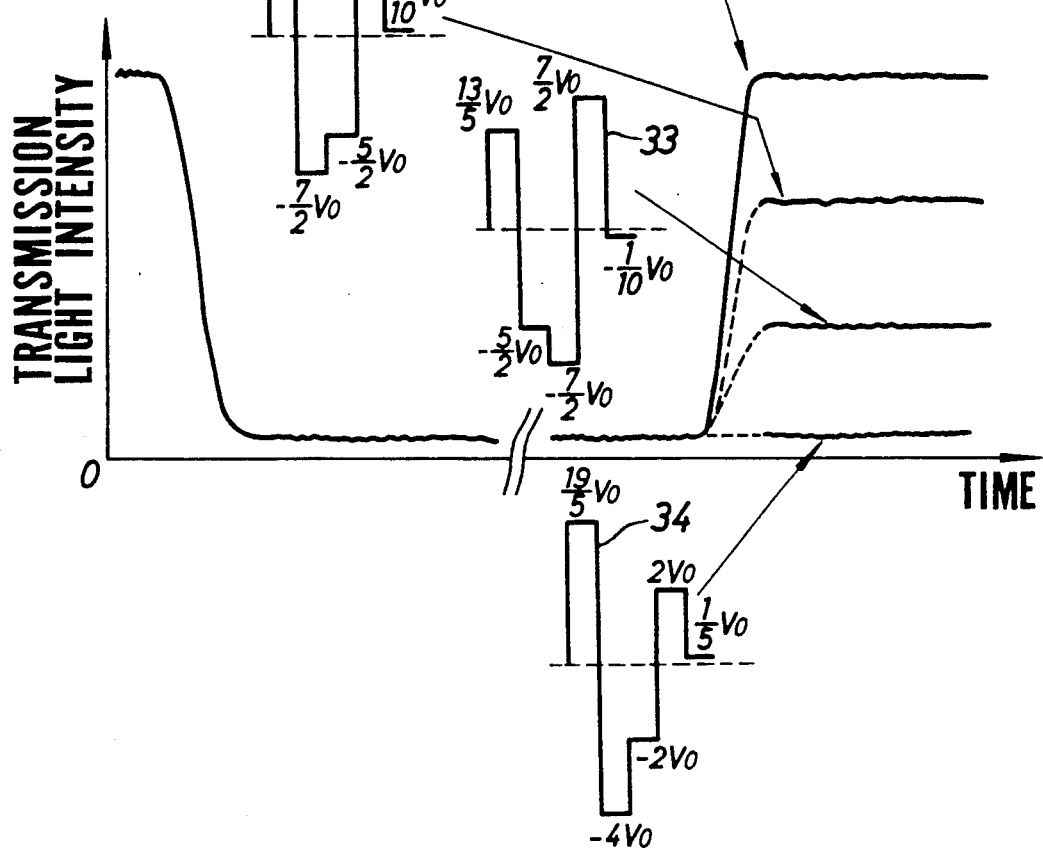

At the driving temperature, multiplex driving was performed using a combination of scanning electrode waveforms and 5-pulse signal waveforms obtained by modulating the voltage peak values shown in FIG. 8 under the conditions of $V_0 = 10$ V and a pulse width of 60 μs. FIGS. 9(a) and 9(b) show operation characteristics of the ferroelectric liquid crystal device in the multiplex driving mode. FIG. 9(a) shows a driving voltage waveform, and FIG. 9(b) shows a transmission light intensity. Reference numeral 31 denotes a voltage waveform in a selection period; 32 to 34 in FIG. 9(b), extracted voltage waveforms of different gray scale levels. With this driving method, precise halftone display could be attained to have a black-and-white level contrast ratio of 1 to 12. When liquid crystal devices adopting ferroelectric liquid crystals Felix005 and Felix009 available from HOECHST Corp. were used, precise halftone display could be similarly attained.

According to this embodiment, since the three stable states can coexist, continuous halftone display can be precisely attained.

What I claim is:

1. A ferroelectric liquid crystal device comprising:
   a) a first substrate disposed adjacent a second substrate, said first and second substrates having opposing surfaces defining a space therebetween;
   b) transparent electrodes disposed on said opposing surfaces of said substrates;
   c) alignment films disposed on said transparent electrodes, said alignment films having a plurality of surfaces inclined with respect to said opposing surfaces, said inclined surfaces of one said alignment film and said inclined surface of other said alignment film having opposite inclination directions; and
   d) a liquid crystal layer disposed in said space between said substrates, said liquid crystal layer having a first fully aligned stable state, a twisted stable state, and a second fully aligned stable state, said aligned and twisted stable states existing simultaneously in the absence of an external force.

2. A ferroelectric device according to claim 1 wherein the thickness of said liquid crystal layer is between 1.5 μm and 4.0 μm.

3. A method for driving a ferroelectric liquid crystal device, the liquid crystal device comprising a first substrate disposed adjacent a second substrate, the first and second substrates having opposing surfaces defining a space therebetween; transparent electrodes disposed on the opposing surfaces of the substrates; alignment films disposed on the transparent electrodes, the alignment films having a plurality of surfaces inclined with respect to the opposing surfaces of the substrates, the inclined surfaces of the first and second alignment films having opposite inclination directions; and a liquid crystal layer disposed between the substrates, the liquid crystal layer having a first fully aligned stable state, a twisted stable state, and a second fully aligned stable state, the thickness of the liquid crystal layer being between 1.5 μm and 4.0 μm whereby the aligned and twisted stable states exist simultaneously in the absence of a bias force; said method comprising the steps of:
   a) applying a first electrical pulse having a first magnitude and a first pulse width across said electrodes;
   b) applying a second electrical pulse having said first magnitude and said first pulse width across said electrodes, said first and second electrical pulses having opposite signs, said first and second electrical pulses setting the liquid crystal in an aligned state;
   c) applying a third electrical pulse having a second magnitude and a second pulse width across said electrodes, and
   d) applying a fourth electrical pulse to having said second magnitude and said second pulse width across said electrodes, said third and fourth pulses having opposite signs,
   wherein a product of said second pulse width and said second magnitude is smaller than a product of said first pulse width and said second magnitude, said third and fourth electrical pulses setting the liquid crystal in the twisted state.

4. A method for driving a ferroelectric liquid crystal device, the liquid crystal device comprising a first substrate disposed adjacent a second substrate, the first and second substrates having opposing surfaces defining a space therebetween; transparent electrodes disposed on the opposing surfaces of the substrates; alignment films disposed on the transparent electrodes, the alignment films having a plurality of surfaces inclined with respect to the opposing surfaces of the substrates, the inclined surfaces of the first and second alignment films having opposite inclination directions; and a liquid crystal layer disposed between the substrates, the liquid crystal layer having a first fully aligned stable state, a twisted stable state, and a second fully aligned stable state, the thickness of the liquid crystal layer being between 1.5 μm and 4.0 μm whereby the aligned and twisted stable states exist simultaneously in the absence of a bias force; said method comprising the steps of:
   a) modulating a scanning electrode waveform and a signal waveform to produce a modulated drive waveform, said scanning electrode waveform having a voltage peak value and a pulse width; and
   b) applying said drive waveform across the transparent electrodes to control the ratio of twisted and uniformly aligned stable states, said ferroelectric device producing continuous gray scale values in response to said drive pulse.

* * * * *